2,848,303

PRODUCTION OF LOWER OXIDES OF TITANIUM

Hugh S. Cooper, Shaker Heights, Ohio, assignor to Walter M. Weil, Cleveland, Ohio No Drawing. Application January 25, 1955
Serial No. 484,063

10 Claims. (Cl. 23—202)

This invention relates to the processing of the rutile form of titanium dioxide to form a lower oxide of titanium.

The objects of the invention are to convert the rutile form of titanium dioxide to a commercially more useful form, to produce a titanium oxide readily soluble in sulfuric acid for use in making titanium pigments, to produce a lower oxide of titanium which is more readily chlorinated to titanium tetrachloride for use in the production of titanium metal, and to accomplish the foregoing in a simple, expeditious, and economical manner using readily available reactants.

Heretofore, rutile titanium dioxide has had limited use in the manufacture of titanium pigment because of its limited solubility in sulfuric acid, and because of its occurrence in limited amounts to serve as a raw material for pigment manufacture.

Ilmenite ores, therefore, have become the main source of titanium for the pigment industry, but its conversion to pigment is complicated and costly because of the relatively impure form of ilmenite ores, and particularly the high iron content of such ores.

In accordance with my prior, copending application Serial No. 352,826, now Patent No. 2,752,300, for Beneficiating Titanium Oxide Ores, ilmenite ores may be heated at about 1100° to 1450° C. with the stoichiometric amount of carbon to reduce the iron oxide of the ore to metallic iron. The reaction conditions convert the $TiO_2$ of the ilmenite to the rutile form, which is difficultly soluble in sulfuric acid. The product, consisting almost entirely of rutile $TiO_2$ and free metallic iron may then be chloridized, preferably with dry hydrogen chloride, to leave a substantially iron-free titanium dioxide residue in rutile form.

In accordance with the present invention, I may convert into a lower oxide of titanium either natural rutile or synthetic rutile from the process of my said prior application (with or without removal of the iron by chloridization). The titanium in this lower oxide product, depending upon the manner in which the process is carried out and the amount of initial impurities, is usually in the form of $Ti_2O_3$, or $TiO$, or a mixture of the two, and is readily soluble in sulfuric acid for making titanium pigment. Being in a lower state of valence than the titanium in $TiO_2$, it is also more readily and economically chloridized to form titanium tetrachloride for the titanium metal industry.

In carrying out the present invention, the rutile starting material, either natural or synthetic, and in finely granular form, is first intimately mixed with finely divided carbon. The amount of carbon should be at least sufficient to react stoichiometrically with one-fourth of the oxygen in the rutile molecules to form carbon monoxide in accordance with the following formula:

(1) $\quad 2TiO_2 + C \rightarrow Ti_2O_3 + CO$

Preferably, the amount of carbon is sufficient to react stoichiometrically with one oxygen atom in each rutile molecule to form monoxide in accordance with the following formula:

(2) $\quad TiO_2 + C \rightarrow TiO + CO$

Reduction of the rutile $TiO_2$ in accordance with one or the other of the foregoing Formulae 1 and 2 is brought about by heating the mixture of rutile and carbon to a temperature above about 1300° C., preferably about 1450° to 1550° C., in an atmosphere of hydrogen. Under such conditions, the reaction rapidly goes substantially to completion as indicated by one or both of the above formulae. The degree to which reduction occurs according to Formula 2 depends upon the amount of carbon added within the above designated range of proportions. Intermediate amounts of carbon within that range produce mixtures of $Ti_2O_3$ and $TiO$ close to the calculated theoretical yields of each lower oxide, assuming complete utilization of the available carbon. While somewhat larger amounts of carbon than the higher amount required by Formula 2 above may be employed to insure complete reduction of the $TiO_2$ to $TiO$, much larger amounts are unnecessary and uneconomical.

Higher temperatures than 1550° C. may also be employed to hasten the reaction, but temperatures much above 1600° C. are not easy to attain for prolonged periods of time without employing expensive furnaces. The reaction is preferably carried out in a refractory lined furnace chamber, and excessive temperatures also reduce the life of the refractory lining.

Both the use of the designated amounts of carbon and a reducing atmosphere, such as hydrogen, appear to be essential to carry the reaction far enough for economical use of the process. While dilution of the hydrogen atmosphere with an inert gas would not prevent the desired reaction from occurring, it would tend to slow it down, and excessive dilution would make it virtually impossible to reduce a substantial proportion of the $TiO_2$ to $TiO$, even with prolonged heating. While it might appear that either the carbon alone or the hydrogen alone should be capable of performing the desired reduction, this appears not to be the case. Though the reason is obscure, the presence of both has been found to be required for reduction of the $TiO_2$ at a practical rate within practical temperature limits.

Using less than the designated amount of carbon appears to limit the $TiO_2$ reduction, regardless of the time and temperature employed within any practical limits, even with an atmosphere of pure hydrogen. In order to produce a product in which the $TiO_2$ is substantially all converted to $TiO$, at least the stoichiometric amount of carbon required by Formula 2 above appears to be essential. If any appreciable amount of iron oxide is present in the starting material, it is preferable to increase the amount of carbon by the amount theoretically required to also reduce the iron in accordance with the following formulae:

$$FeO + C \rightarrow Fe + CO$$

or $$Fe_2O_3 + 3C \rightarrow 2Fe + CO$$

The invention will be better understood and its practicality more fully appreciated by reference to the following illustrative examples using both natural and synthetic rutiles. The two starting materials were of approximately the following compositions:

|  | Natural percent | Synthetic percent |
| --- | --- | --- |
| $TiO_2$ | 95.73 | 96.95 |
| $FeO$ | 1.25 | 0.28 |
| $SiO_2$ | 1.03 | 0.20 |
| $ZrO_2$ | 0.73 | 0.15 |
| $SrO$ | 0.10 | |
| $BaO$ | 0.10 | |
| $CaO$ | 0.05 | |
| $Cr_2O_3$ | 0.22 | 0.05 |
| $V_2O_5$ | 0.57 | 0.18 |
| $Al_2O_3$ | 0.15 | 0.30 |
| Undetermined | 0.07 | 1.89 |

*Example 1*

160 grams of natural rutile ore of 300 mesh particle size were intimately mixed with 12 grams of finely divided carbon and placed in a graphite crucible. While flowing hydrogen through the crucible to carry off the CO as it was formed and to maintain a reducing atmosphere consisting essentially of hydrogen, the contents were heated to a temperature in the range of 1500° to 1550° C. for a period of about 2 hours, whereupon the heating was discontinued and the charge permitted to cool. The residue was a dark blue, granular oxide of titanium.

Assuming that the rutile ore was pure $TiO_2$ and that the $TiO_2$ was completely reduced to $Ti_2O_3$, the residue in the crucible should have been 144 grams. The actual weight of the residue in the crucible was 140 grams, indicating reduction of some of the titanium oxide to a still lower oxide form, such as TiO. Analysis of the product showed a titanium content of 68% compared to a theoretical titanium content of 66.6% for $Ti_2O_3$, thus confirming substantially complete reduction of the titanium at least to the form of $Ti_2O_3$ with a relatively small amount being reduced to TiO. The residue was about 90% soluble in sulfuric acid in a relatively short time.

*Example 2*

80 grams of natural rutile ore of 300 mesh particle size were intimately mixed with 12 grams of finely divided carbon and placed in a graphite crucible. While maintaining an atmosphere consisting essentially of hydrogen in the same manner as in Example 1, the contents of the crucible were heated to a temperature in the range of 1500° to 1525° C. for a period of about 1½ hours, whereupon the heating was discontinued and the charge permitted to cool. The residue was a grayish-brown, powdered oxide of titanium.

Assuming that the rutile ore was pure $TiO_2$ and that the $TiO_2$ was completely reduced to TiO, the residue in the crucible should have been 64 grams. The actual weight was 66 grams, indicating reduction of the original oxide to TiO with the balance probably being reduced to $Ti_2O_3$. Analysis of the product showed a titanium content of about 72%, compared to a theoretical titanium content of 75% for TiO, thus confirming that practically complete reduction of the titanium to TiO occurred. The residue was about 95% soluble in sulfuric acid in a relatively sort time.

*Example 3*

160 grams of synthetic rutile ore of about 200 mesh particle size were intimately mixed with 12 grams of finely divided carbon and placed in a graphite crucible. While maintaining an atmosphere consisting essentially of hydrogen in the same manner as in Example 1, the contents of the crucible were heated to a temperature in the range of 1400° to 1525° C. for a period of about 5 hours. The residue was a dark blue, granular oxide of titanium.

The weight of the residue was 135 grams against a theoretical recovery of 144 grams, and the titanium content of the residue was about 68%, thus again indicating substantially complete reduction of the titanium at least to the form of $Ti_2O_3$ with a relatively small amount being reduced to TiO. The residue was about 94% soluble in sulfuric acid, in a relatively short time.

*Example 4*

80 grams of synthetic rutile of about 200 mesh particle size were intimately mixed with 12 grams of finely divided carbon and placed in a graphite crucible. While maintaining an atmosphere consisting essentially of hydrogen in the same manner as in Example 1, the contents of the crucible were heated to a temperature in the range of 1450° to 1550° C. for a period of about 3½ hours. The residue was a grayish brown powdered titanium oxide.

The weight of the residue was 65.5 grams against a theoretical recovery of 64 grams and the titanium content of the residue was about 73% against a theoretical 75% for pure TiO, thus indicating substantially complete reduction of the original oxide to TiO with a relatively small amount being reduced to $Ti_2O_3$. The residue was about 94% soluble in sulfuric acid in a relatively short time.

In the foregoing examples, the temperature to which the contents of the crucible were heated ranged from about 1400° C. to about 1550° C. The time of heating was determined without previous experience and, as in Example 3, probably substantially exceeded the time actually required to carry the reaction to the point indicated by the resulting analyses. Obviously, the time required will vary somewhat with the particular temperature employed, and the temperatures utilized in the examples, therefore, merely represent a presently preferred range for efficient operation. A temperature of about 1300° C. appears to be a practical lower limit to be maintained in commercial operations, and temperatures well above 1600° C. may be employed if desired, where suitable equipment is available.

Because of the formation of CO gas during the reaction, the atmosphere in the crucible obviously cannot consist entirely of pure hydrogen. However, by maintaining a constant flow of hydrogen into and through the system, the amount of CO gas present at any time may be kept relatively small, so as to have no material retarding effect upon the reaction.

Depending upon the most convenient source of hydrogen, this reducing gas may or may not be diluted to some extent with an inert gas, such as nitrogen. For example, the mixture of nitrogen and hydrogen resulting from the cracking of ammonia may be used directly in the process, the resulting 25% dilution of the hydrogen with nitrogen, which is non-oxidizing and completely inert in the process, not being excessive for the purposes of this invention. Similarly, the introduction of ammonia directly into the system is feasible, inasmuch as the ammonia immediately breaks down at the high temperature maintained in the system.

From the foregoing remarks it will be appreciated that the active atmosphere consists essentially of hydrogen, such other inactive gases as are present in relatively small amounts having nothing more than a slight retarding effect upon the speed and efficiency of the reaction. Accordingly, the term "atmosphere consisting essentially of hydrogen" is intended to embrace atmospheres of the character referred to.

Since the reaction, in order to result in the reduction of all of the $TiO_2$ at least to the form of $Ti_2O_3$, requires a ratio of carbon to $TiO_2$ of at least 3:40, the use of any lesser proportion of carbon to $TiO_2$ in the charge would obviously be uneconomical for the purposes of the invention. The use of only slightly lower ratios of carbon to $TiO_2$ in the original charge results in a lower yield of the desired lower oxide.

From the foregoing description and examples of the present invention, it will be appreciated that I have provided a simple and highly efficient and economical process for converting rutile to a lower oxide or oxides which are substantially completely soluble in sulfuric acid. Such lower oxides are ideal starting materials for the production of titanium pigments according to present commercial processes.

The lower oxides, having the titanium in a lower state of valence, are more rapidly and efficiently chloridized by chloridizing gases in the production of titanium tetrachloride. Since the conversion of titanium oxide to titanium tetrachloride for use in the production of titanium metal is generally accomplished by high temperature chloridization of the oxide, the preliminary reduction of rutile to a lower oxide in accordance with the present invention may also be employed to advantage as a step in the production of titanium tetrachloride for the titanium metal industry and for various other purposes. Thus, while the product of the present invention has been referred to as "a lower oxide of titanium soluble in sulfuric acid," for purposes of identification, it will be appreciated that the utility of the invention is not limited to the use of such product in processes involving solution of the product in sulfuric acid.

Having described my invention, I claim:

1. The method of converting rutile titanium dioxide into a lower oxide of titanium soluble in sulfuric acid, comprising preparing an intimate mixture of rutile and finely divided carbon in an amount between about 7½% and 15% of the weight of rutile, and heating the mixture for up to several hours in an atmosphere consisting essentially of hydrogen at ambient pressures and at a temperature in the range of about 1300° C. to 1600° C. until the rutile is substantially all reduced at least to the lower oxide, $Ti_2O_3$, and the carbon is substantially all consumed and evolved as CO.

2. The method of converting rutile titanium dioxide into a lower oxide of titanium soluble in sulfuric acid, comprising preparing an intimate mixture of rutile and finely divided carbon in an amount between about 7½% and 15% of the weight of rutile, and heating the mixture for up to several hours in an atmosphere consisting essentially of hydrogen at ambient pressures and at a temperature in the range of about 1400° C. to 1600° C. until the rutile is substantially all reduced at least to the lower oxide, $Ti_2O_3$, and the carbon is substantially all consumed and evolved as CO.

3. The method of converting rutile titanium dioxide into a lower oxide of titanium soluble in sulfuric acid, comprising preparing an intimate mixture of rutile and finely divided carbon in an amount of about 15% of the weight of rutile, and heating the mixture for up to several hours in an atmosphere consisting essentially of hydrogen at ambient pressures and at a temperature in the range of about 1300° C. to 1600° C. until the rutile is substantially all reduced to TiO.

4. The method of converting rutile titanium dioxide into a lower oxide of titanium soluble in sulfuric acid, comprising preparing an intimate mixture of rutile and finely divided carbon in an amount about 15% of the weight of rutile, and heating the mixture for up to several hours in an atmosphere consisting essentially of hydrogen at ambient pressures and at a temperature in the range of about 1400° C. to 1600° C. until the rutile is substantially all reduced to TiO.

5. The method of treating rutile titanium dioxide to reduce the titanium to a lower oxide soluble in sulfuric acid, comprising mixing finely granular rutile and an amount of finely divided carbon which will react stoichiometrically with from one-fourth to one-half of the oxygen in the rutile to form CO, and heating the mixture for up to several hours in an atmosphere consisting essentially of hydrogen at ambient pressures and at a temperature in the range of about 1300° C. to 1600° C. until said reaction is substantially complete.

6. The method of treating rutile titanium dioxide to reduce the titanium to a lower oxide soluble in sulfuric acid, comprising mixing finely granular rutile and an amount of finely divided carbon which will react stoichiometrically with about one-half of the oxygen in the rutile to form CO, and heating the mixture for up to several hours in an atmosphere consisting essentially of hydrogen at ambient pressures and at a temperature in the range of about 1300° C. to about 1600° C. until said titanium dioxide is substantially all reduced to titanium monoxide.

7. The method of treating rutile titanium dioxide to reduce the titanium to a lower oxide soluble in sulfuric acid, comprising mixing finely granular rutile and an amount of finely divided carbon which will react stoichiometrically with from one-fourth to one-half of the oxygen in the rutile to form CO, and heating the mixture for up to several hours in an atmosphere consisting essentially of hydrogen at ambient pressures and at a temperature in the range of about 1400° C. to 1600° C. until said reaction is substantially complete.

8. The method of treating rutile titanium dioxide to reduce the titanium to a lower oxide soluble in sulfuric acid, comprising mixing finely granular rutile and an amount of finely divided carbon which will react stoichiometrically with about one-half of the oxygen in the rutile to form CO, and heating the mixture for up to several hours in an atmosphere consisting essentially of hydrogen at ambient pressures and at a temperature in the range of about 1400° C. to 1600° C. until said titanium dioxide is substantially all reduced to titanium monoxide.

9. The method of producing TiO from rutile titanium dioxide, comprising heating an intimate mixture of finely granular rutile and finely divided carbon to a temperature in the range of about 1300° C. to 1600° C. in an atmosphere consisting essentially of hydrogen at ambient pressures, the amount of carbon being about 15% of the amount of rutile by weight, and the heating in said atmosphere being continued for up to several hours until the titanium in the rutile is substantially entirely reduced to the lower oxide, TiO.

10. The method of producing TiO from rutile titanium dioxide, comprising heating an intimate mixture of finely granular rutile and finely divided carbon to a temperature in the range of about 1400° to 1600° C. in an atmosphere consisting essentially of hydrogen at ambient pressures, the amount of carbon being about 15% of the amount of rutile by weight, and the heating in said atmosphere being continued for about 1½ to 3 hours.

References Cited in the file of this patent

UNITED STATES PATENTS

| | | |
|---|---|---|
| 2,681,849 | Sibert et al. | June 22, 1954 |
| 2,733,133 | Cave et al. | Jan. 31, 1956 |
| 2,750,259 | Steinberg et al. | June 12, 1956 |

OTHER REFERENCES

J. Barksdale: "Titanium," 1949 ed., pages 59 and 61, The Ronald Press Co., New York, N. Y.

Chemical Abstracts, vol. 36, pages 2243 and 2244, vol. 39, page 5418, and vol. 40, page 3575, referring to works by G. A. Meerson and Lipkes.